United States Patent
Hyde et al.

(10) Patent No.: US 8,897,115 B2
(45) Date of Patent: *Nov. 25, 2014

(54) TOPOGRAPHIC FEEDFORWARD SYSTEM

(71) Applicant: Elwha LLC, Bellevue, WA (US)

(72) Inventors: Roderick A. Hyde, Redmond, WA (US); Jordin T. Kare, Seattle, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,827

(22) Filed: May 23, 2014

(65) Prior Publication Data

US 2014/0269239 A1   Sep. 18, 2014

Related U.S. Application Data

(63) Continuation of application No. 13/735,960, filed on Jan. 7, 2013, now Pat. No. 8,737,183.

(51) Int. Cl.
    *G11B 5/455* (2006.01)
    *G11B 21/21* (2006.01)
(52) U.S. Cl.
    CPC ..................................... *G11B 21/21* (2013.01)
    USPC .......................................... 369/53.39; 360/75
(58) Field of Classification Search
    None
    See application file for complete search history.

(56) References Cited

U.S. PATENT DOCUMENTS

| | | |
|---|---|---|
| 4,631,606 A | 12/1986 | Sugaya |
| 5,255,075 A | 10/1993 | Cush |
| 5,368,546 A | 11/1994 | Stark et al. |
| 5,818,592 A | 10/1998 | Womack et al. |
| 5,910,936 A | 6/1999 | Marino |
| 6,501,606 B2 | 12/2002 | Boutaghou et al. |
| 6,888,694 B2 | 5/2005 | Guo et al. |
| 7,068,449 B2 | 6/2006 | Riddering et al. |
| 7,170,700 B1 | 1/2007 | Lin et al. |
| 7,193,806 B1 | 3/2007 | Albrecht et al. |
| 7,215,500 B1 | 5/2007 | Albrecht et al. |
| 7,236,330 B2 | 6/2007 | Suk |
| 7,271,975 B2 | 9/2007 | Shimizu et al. |

(Continued)

FOREIGN PATENT DOCUMENTS

| | | |
|---|---|---|
| IN | 1998KO02081 A | 1/2006 |
| JP | 2009/054230 A | 3/2009 |
| WO | WO 2010/104466 A1 | 9/2010 |

OTHER PUBLICATIONS

PCT International Search Report; International App. No. PCT/US2014/010330; Jun. 3, 2014; pp. 1-2.

(Continued)

*Primary Examiner* — Brenda Bernardi

(57) ABSTRACT

A control mechanism may control the height and/or position of a read/write head configured to interact with a rotating information storage surface. A computation unit may compute a detected topography from gap measurements using a dynamic filter including a model of read/write head dynamics. A sensor may detect gap measurements of a side read/write track while the read/write head is interacting with a current read/write track. A memory may store the detected topography. The control mechanism may adjust the height of the read/write head based on the detected and/or stored topography. The control mechanism may be a reactionless control mechanism configured to apply a counterforce to offset movements of the read/write head and/or a slider.

33 Claims, 8 Drawing Sheets

(56) References Cited

U.S. PATENT DOCUMENTS

| | | |
|---|---|---|
| 7,277,252 B1 | 10/2007 | Albrecht et al. |
| 7,280,301 B1 | 10/2007 | Jackson et al. |
| 7,359,138 B1 | 4/2008 | Albrecht et al. |
| 7,372,650 B1 | 5/2008 | Kupferman |
| 7,446,970 B2 | 11/2008 | Nakajima et al. |
| 7,450,333 B2 | 11/2008 | Hirano et al. |
| 7,457,069 B2 | 11/2008 | Yoshioka et al. |
| 7,675,707 B1 | 3/2010 | Liu et al. |
| 8,059,357 B1 | 11/2011 | Knigge et al. |
| 8,169,745 B2 | 5/2012 | Yao et al. |
| 8,213,105 B2* | 7/2012 | Bui et al. .................. 360/75 |
| 8,320,069 B1 | 11/2012 | Knigge et al. |
| 2001/0043064 A1 | 11/2001 | Bosselmann et al. |
| 2002/0030666 A1 | 3/2002 | Philipp |
| 2002/0097514 A1 | 7/2002 | Boutaghou |
| 2002/0176334 A1 | 11/2002 | Yamanaka |
| 2003/0011915 A1 | 1/2003 | Riddering et al. |
| 2003/0065495 A1 | 4/2003 | Lee et al. |
| 2003/0184909 A1 | 10/2003 | Zhang et al. |
| 2004/0174628 A1 | 9/2004 | Schwarz et al. |
| 2004/0252393 A1 | 12/2004 | Wang et al. |
| 2006/0044669 A1 | 3/2006 | Shimizu et al. |
| 2006/0056096 A1 | 3/2006 | Nakajima et al. |
| 2006/0203376 A1 | 9/2006 | Yoshioka et al. |
| 2007/0146920 A1 | 6/2007 | Kitamura et al. |
| 2008/0117550 A1 | 5/2008 | Zhang |
| 2008/0158715 A1 | 7/2008 | Hirano et al. |
| 2008/0165446 A1 | 7/2008 | Partee |
| 2010/0302798 A1 | 12/2010 | Papakonstantinou et al. |
| 2011/0158072 A1* | 6/2011 | Oh et al. .................. 369/53.38 |
| 2012/0287536 A1 | 11/2012 | Kuwajima |
| 2014/0177090 A1 | 6/2014 | Contreras et al. |

OTHER PUBLICATIONS

PCT International Search Report; International App. No. PCT/US2014/010336; Jun. 10, 2014; pp. 1-2.

Horowitz et al., "Dual-stage servo systems and vibration compensation in computer hard disk drives", Control Engineering Practice 15 (2007) pp. 291-305.

Horowitz et al., "Microactuators for Dual-Stage Servo Systems in Magnetic Disk Files," Handbook of Nanotechnology, B. Bhushan (Ed.) (Springer, Berlin, Heidelberg 2004) US.

* cited by examiner

TOPOGRAPHIC FEEDFORWARD SYSTEM

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

This application is a continuation of U.S. patent application Ser. No. 13/735,960, filed Jan. 1, 2013, for "Topographic Feedforward System," which is hereby incorporated by reference in its entirety.

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

This application relates to systems and methods for controlling read/write heads that interact with rotating information storage surfaces.

SUMMARY

A read/write head may be configured to interact with tracks on a rotating information storage surface. The rotating information storage surface may be an optical disk, a magnetic disk platter, atomic force microscopy data storage surfaces, and/or the like. If the read/write head is too far from or too close to the rotating information storage surface, the read/write head may not be able to read or write information from or to the rotating information storage surface and/or the read/write head may damage the rotating information storage surface. To achieve a desired gap between the read/write head and the rotating information storage surface, a height control mechanism may adjust a height of the read/write head based on the upcoming topography.

The topography may be computed from gap measurements using a dynamic filter including a model of read/write head dynamics. Topographic features on a side read/write track may be detected when the read/write head is interacting with a current read/write track, and/or upcoming topographic features on the current track may be detected. Detected topographic features can be stored in a memory and later retrieved when the read/write head is interacting with a read/write track corresponding to stored topographic features. The height control mechanism may adjust the height of the read/write head based on the stored and/or computed topographic features. The topographic features may include a sequence and/or functional representation of topographic data. The height control mechanism may be configured to make a plurality of adjustments based on the sequence and/or functional representation of the topographic data.

Rotational and/or lateral movements of the read/write head and/or a slider may cause vertical motion due to cross coupling. In addition, rotational and/or translational movements may cause reaction forces and/or torques to act on a suspension system and/or exterior components. A reactionless control system may be used to control rotational and/or translational movement of the read/write head and/or slider. The reactionless control system may apply an opposing counterforce to offset movement of the read/write head and/or slider, such as by moving a counterbalance.

DETAILED DESCRIPTION OF PREFERRED EMBODIMENTS

Figure 1A:
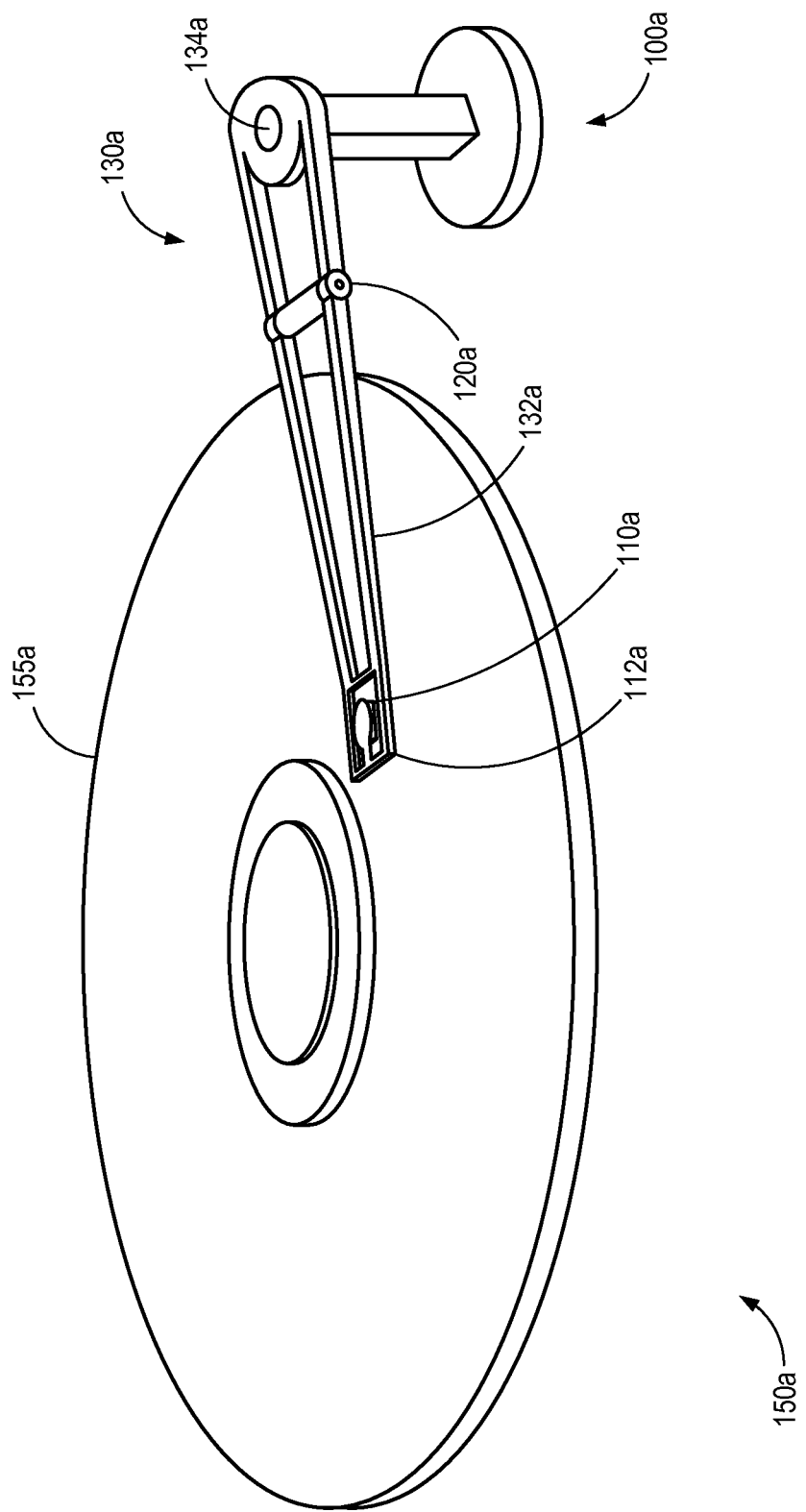
FIG. 1A is a perspective view of a control system for a magnetic storage device.

Storage devices, such as magnetic and optical disks, atomic force microscopy (AFM) storage devices, and the like, may include a read/write head configured to interact with a rotating information storage surface storing data. The read/write head may include a magnetic head, such as a magnetoresistive head, an optical pickup head, an AFM tip, and/or the like. The rotating information storage surfaces may include magnetic disk platters, optical disks, AFM data storage surfaces, and/or the like. As the density of storage devices increases, more precise positioning of the read/write head is required to read the data from the rotating information storage surfaces. Rotating information storage surfaces may have irregular variations in the surface height, such as protrusions, dips, and/or the like, that may interfere with reading and writing by the read/write head.

Accordingly, a height control mechanism may adjust the height and/or orientation of a read/write head and/or a slider coupled to the read/write head to avoid head crashes and/or maintain a desired gap between the read/write head and the rotating information storage surface. The height control mechanism may adjust the height of the read/write head by adjusting the height of the slider and/or by adjusting the height of the read/write head relative to the slider. The read/write head may include a read head and a write head separate from the read head. The heights of the separate read and write heads may be adjusted independently in some embodiments and/or the height control mechanism may adjust the heights of the read and write heads in an identical manner.

To determine what adjustments should be made, the system may include one or more sensors. The sensors may measure one or more system states, such as a gap between the read/write head and the rotating information storage surface, a position of the read/write head, strains on a slider suspension, and/or the like. The sensors may measure upcoming topographic features on a current read/write track with which the read/write head is interacting, topographic features on a side read/write track while the read/write head is interacting with the current track, and/or the like. The sensors may include capacitive sensors, such as electrode capacitive sensors; optical sensors, such as multi-lens optical sensors and interferometers; evanescent wave sensors; magnetic field sensors; and/or the like.

A computation unit may use a dynamic filter to compute a topographic profile of the rotating information storage surface from the gap measurements. The dynamic filter may include a noise reduction filter, such as a Kalman filter. The dynamic filter may estimate a system state using a plurality of inputs including a dynamics model, known control inputs, measurement data from the sensors, and the previous estimate of the system state. For example, the computation unit may use the dynamic filter to estimate a topographic profile and/or a position of the read/write head from a model of read/write head dynamics, indications of adjustments by the height control mechanism, the gap measurements, and the stored estimates of the topographic profile, such as previously computed estimates. The computation unit may compute the topographic profile during operational interaction between the read/write head and the rotating information storage surface. Such computation may include determining changes to the topographic profile during operation.

From the computed topographic profile, the computation unit may determine what adjustments by the height control mechanism are necessary to create a desired gap between the slider and/or read/write head and the rotating information storage surface. The adjustments may be transmitted to the height control mechanism, which may adjust the height of the read/write head and/or slider to create the desired gap. The computation unit may determine a desired separation distance based on modeling by the dynamic filter, such as based on estimates of variance in the height of the topographic features by the dynamic filter. In an embodiment, the computation unit may determine what adjustments will maintain a constant gap spacing between the slider and/or read/write head and the rotating information storage surface. The dynamic filter may include a model of read/write head responses to control adjustments, which the computation unit uses to compute a control adjustment that will achieve the desired gap. The model of read/write head responses may include a model of a frequency response to control adjustments. The dynamic filter may be configured to determine vertical motion of the slider, such as height, velocity, and/or oscillations of the slider.

The dynamic filter may also include one or more models of other system characteristics. The dynamic filter may include a model of interactions between the read/write head and the rotating information storage surface, such as aerodynamic interactions, electrostatic interactions, magnetic interactions, Casimir interactions, evanescent interactions, Van der Waals interactions, and/or the like. The dynamic filter may include a model of slider characteristics, such as mass, inertial moment, geometry, aerodynamic characteristics, and/or the like. The dynamic filter may include a model of characteristics of a suspension system supporting the slider, such as force, stiffness, moments, inertia, and/or the like. The dynamic filter may include a model of sensor characteristics. The dynamic filter may also include a model of coupled behavior between the slider suspension and the rotating information storage surface, between slider aerodynamics and the rotating information storage surface, and/or the like.

The computation unit may use the dynamic filter to determine system characteristics. For example, the computation unit may determine characteristics of the slider, the suspension system, and/or the like using the dynamic filter. The computation unit may also determine environmental conditions using the dynamic filter. The computation unit may use the determined system and/or environmental characteristics to update models of these characteristics in the dynamic filter. The computation unit may use previous determinations of system and/or environmental characteristics when determining the updated system and/or environmental characteristics. The computation unit may determine changes to the system and/or environmental characteristics during operational interaction between the read/write head and the rotating information storage surface.

The computation unit may compute the topographic profile as a function of position. For example, the topographic profile may be computed as a function of radial position, as a function of azimuthal position, and/or the like. The computation unit may compute global height variations among a plurality of sections of the rotating information storage surface, such as radially and/or azimuthally divided sections. The computation unit may compute an average, median, maximum, and/or minimum height of each section and/or the like. Alternatively or in addition, the computation unit may compute a Fourier series representation of the global height variations among the plurality of sections. The computation may compute local height variations as well or instead. The local height variations may be computed over a predetermined range of spatial sizes, spatial size scales, and/or wavenumbers. The local height variations may be computed over and/or in terms of a wavelength of a reference frequency. The reference frequency may be the frequency at which an optical gap detection sensor operates.

A topography detection mechanism and/or a sensor may be configured to detect topographic figures of one or more side read/write tracks while the read/write head is interacting with the current track, such as by measuring a gap between the read/write head and the rotating information storage surface and calculating indications of the detected topographic features from the measured gap. An indication of the height of the read/write head may be received from the height control mechanism, and the indications of the topographic features may be computed from the measured gap and the indication of the height of the read/write head. The height control mechanism may adjust the height of the read/write head based on the indications of the detected topographic features.

A side track may be separated from the current track by a predetermined number of tracks, for example the side track may be adjacent to the current track, one interposed track may separate the side track from the current track, the side track may be N tracks away from the current tracks, and/or the like. When detecting topographic features of a plurality of side tracks, the side tracks may be on opposite sides of the current track (e.g., a first side track may be on a first side of the current track and a second side track may be on a second side of the current track).

The indications of the detected topographic features may be stored in a memory. The height control mechanism may adjust the height of the read/write head while the read/write head is interacting with the current track based on previously stored indications of topographic features of the current track. The computation unit may be configured to incorporate a stored topographic profile when computing the topographic profile. For example, the computation unit may update a previously computed topographic profile stored in the memory. The computation unit may use the dynamic filter to incorporate the stored topographic profile.

The memory may store processed and/or encoded indications of the topographic features computed by a processing, encoding, and/or computation unit. The memory may store the indications of the topographic features according to position, such as according to radial and/or azimuthal position. The memory may associate the indications of topographic features with a radial and/or azimuthal position of the topographic features. The memory may store the topographic features in a memory address corresponding to the radial and/or azimuthal position of the topographic features. The memory may store the radial and/or azimuthal position of the topographic features. The memory may include a semiconductor memory, a memory external to an enclosure encasing the rotating information storage surface, the rotating information storage surface, and/or the like.

The computation unit and/or the height control mechanism may be configured to match detected topographic features computed from gap measurements with stored topographic features to determine upcoming topographic features. In an embodiment, the detected topographic features of the current track may be matched with stored topographic features of a previous track adjacent to the current track. Alternatively, the detected topographic features of a side track adjacent to the current track may be matched with stored topographic features of the current track. Previously stored indications of features of a track, such as the current track or a side track, may be matched with currently detected features of the same track. The computation unit and/or the topography detection mechanism may be configured to determine a radial and/or azimuthal position of the detected topographic features. The radial and/or azimuthal position may be used to retrieve stored topographic features associated in the memory with that radial and/or azimuthal position.

An interpolation and/or extrapolation unit may be configured to interpolate and/or extrapolate indications of topographic features of the current track from indications of topographic features of one or more side tracks. Alternatively or in addition, the interpolation unit may compute indications of topographic features of an intermediate read/write track from the indications of the topographic features of one or more side tracks. The interpolation unit may be configured to receive the indications of the topographic features of the one or more side tracks from the memory. When interpolating the indications of the topographic features of the intermediate track, the interpolation unit may incorporate estimates of the topographic features of the intermediate track. For example, the interpolation unit may determine the indications of the topographic features of the intermediate track based on previously obtained indications of the topographic features of the intermediate track and/or based on indications of detected topographic features. After the indications of the topographic features of the intermediate track have been determined by the interpolation unit, the memory may store the determined indications. The memory may replace previously stored indications of the topographic features with the determined indications.

The read/write head may make multiple passes over the current read/write track in some embodiments. The sensor may detect gap measurements and/or topographic features during a first pass, and the read/write head may interact with the current track during a second pass. The speed of the read/write head may be faster during the second pass, and/or the height control mechanism may adjust the height of the read/write head during the second pass. Gap measurements and/or topographic features may also be detected during the second pass. Alternatively or in addition, the topography detection mechanism may detect topographic features of one or more side tracks during a first pass. During a second pass, one of the side tracks may be the current track, and the topography detection mechanism may detect topographic features of the current track. As a result, topographic features for each track may be detected multiples times. In any embodiment with detection of topographic features and/or gap measurements during multiple passes, the sampling rate and/or vertical resolution may vary between the passes. For example, the sampling rate and/or vertical resolution of the first pass may be greater or less than the sampling rate and/or vertical resolution of the second pass.

A variety of indications may be used to represent topographic features and/or the topographic profile. The indications may comprise height information, slope information, such as radial slope information and/or azimuthal slope information, high spatial frequency height deviations relative to a low frequency background height, and/or the like. A functional representation may be used to represent the topographic features and/or topographic profile. The functional representation may include a Fourier series, a spline fit, and/or the like. The functional representation may be computed from gap measurements and/or the height of the read/write head.

The topographic profile and/or features may be represented by a sequence of topographic data. The sequence of topographic data may correspond to different azimuthal locations. The sequence may correspond to uniformly and/or non-uniformly spaced azimuthal locations. The height control mechanism may be configured to make a plurality of height adjustments to the height of the read/write head and/or the slider based on the sequence of topographic data. The sequence of data may include indications of local protrusions and/or dips in the rotating information storage surface.

The sequence may include a functional representation of the topographic features, such as a functional representation with respect to radial and/or azimuthal position, a Fourier series, a spline fit, and/or the like. The sequence and/or functional representation of topographic features may be computed from gap measurements, such as gap measurements acquired during operation of the read/write head. The computation unit may compute the sequence and/or functional representation by using the dynamic filter to model read/write head movements. The computation unit may be configured to interpolate interstitial data points within the sequence of topographic data. The functional representation may be used to compute the interstitial data points.

The sequence and/or functional representation may be computed during a first operation of the read/write head, and the height of the read/write head may be adjusted during a second operation. The read/write head may interact with a read/write track during the first and/or second operation. For example, the sequence and/or functional representation may be computed from gap measurements made during a first pass, and the height control mechanism may make a plurality of adjustments to the height of the read/write head while it interacts with the read/write track during a second pass. The second pass may be at a greater speed than the first pass.

The computation unit may be configured to compute a time or frequency scale for the sequence and/or functional representation based on a linear speed of the read/write head relative to the rotating information storage surface. The computation unit and/or height control mechanism may be configured to determine height adjustments to respond to periodic variations in the sequence and/or functional representation. Alternatively or in addition, the computation unit and/or height control mechanism may be configured to determine height adjustments based on a time response of actuation of the read/write head.

The memory may store the sequence and/or functional representation. The memory may be configured to store a predetermined and/or factory-loaded sequence and/or functional representation. The stored sequence and/or functional representation may be matched to a detected sequence and/or functional representation to determine upcoming features. The stored and detected sequences and/or functional representations may come from the same track, adjacent tracks, tracks within a predetermined distance of each other, and/or the like. The stored sequences and/or functional representations may be associated in the memory with a radial and/or azimuthal position.

The computation unit may be configured to determine a plurality of height control mechanism actuations to achieve the plurality of height adjustments by using the dynamic filter to model read/write head responses to height control mechanism actuation. The computation unit may also use the dynamic filter to model coupled behavior between the rotating information storage surface and the slider, the slider suspension, and/or the slider aerodynamics, and the computation unit may determine the plurality of height control mechanism actuations based on the modeling of coupled behavior. The height control mechanism may be configured to maintain a desired separation distance based on the sequence and/or functional representation of topographic features and the modeling by the dynamic filter. The height control mechanism may also or instead use the modeling by the dynamic filter to avoid surface collisions.

A reactionless control system may be used to prevent reaction forces and/or torques from acting on the read/write head and undesirably altering its position. For example, the height control mechanism may respond to an upcoming dip in the rotating information storage surface by commanding the read/write head to move downward from the slider. This motion will normally impose a reaction force on the slider which may induce vertical oscillations in its height which can persist long after the dip has passed. To avoid this type of undesired effect, a reactionless control system may be used, accompanying the downward motion of the read/write heat with a corresponding upward motion of a second mass, thereby not imposing a reaction force on the slider, and not initiating oscillations of it. In another embodiment, the reactionless control system may move a second mass to counteract commanded motions of the slider. The reactionless control system may be configured to perform a first slider and/or read/write head movement and to apply a counterforce to offset the first movement. The reactionless control mechanism may be configured to offset rotational and/or translational movements including vertical and/or lateral movements. The reactionless control system may apply the counterforce by moving a second mass. The movement of the second mass may be rotational and/or translational, such as vertical or lateral movement, and may oppose the first movement. The second mass may weigh the same as the slider and/or the read/write head. The reactionless control system may move a plurality of masses to offset a plurality of slider and/or read/write head movements. For example, movement of the second mass may offset a translational movement and movement of a third mass may offset a rotational movement.

The reactionless control system may be configured to isolate the slider and/or the read/write head. The reactionless control system may isolate the slider from an exterior component coupled to the slider, such as a suspension system and/or suspension arm supporting the slider. For example, the reactionless control system may prevent a reaction force or torque from acting on the exterior component and/or a connection to the exterior component. The reactionless control system may be configured to minimize a frequency response of the exterior component and/or the slider. The reactionless control system may isolate the slider from movement of the read/write head, such as by minimizing a frequency response of the read/write head. A time profile of the counterforce may match or differ from a time profile of the first movement. The first movement and counterforce may occur simultaneously. The counterforce may begin before or after the first movement starts and end before or after the movement stops.

Vertical motion can be induced in the slider and/or read/write head from lateral slewing of the slider and/or read/write head. The reactionless control system may be configured to apply a counterforce to counteract the vertical motion, and/or the height control mechanism may be configured to adjust the height of the slider and/or read/write head to control the vertical motion. The computation unit may be configured to determine the counterforce and/or height adjustment necessary based on a model of interactions between the lateral slewing and the vertical motion. The dynamic filter can include the model of coupled lateral and vertical motion, and the computation unit may use the dynamic filter to determine the counterforce and/or height adjustments.

FIG. 1A is a perspective view of a control system 100a for a magnetic storage device 150a. The control system 100a may be configured to control a read/write head 112a that interacts with a magnetic disk platter 155a. The read/write head 112a may be coupled to a slider 110a, and/or the slider 110a may include the read/write head 112a. The slider 110a may be configured to rest on a thin layer of fluid, such as air, and thereby suspend the read/write head 112a over the magnetic disk platter 155a. The slider 110a may be coupled to a suspension system 130a. The suspension system 130a may include an arm 132a and an actuator 134a to move the arm 132a rotationally.

The arm 132a may also include a height control mechanism 120a. The height control mechanism 120a may be configured to adjust a height of the slider 110a and/or read/write head 112a. The height control mechanism 120a may include a motor, such as a stepper motor, a piezoelectric actuator, and/or the like to actuate height adjustments. The illustrated height control mechanism 120a is located on the arm 132a, but the height control mechanism 120a may also be configured to move the slider 110a relative to the arm 132a and/or the read/write head 112a relative to the slider 110a.

Figure 1B:
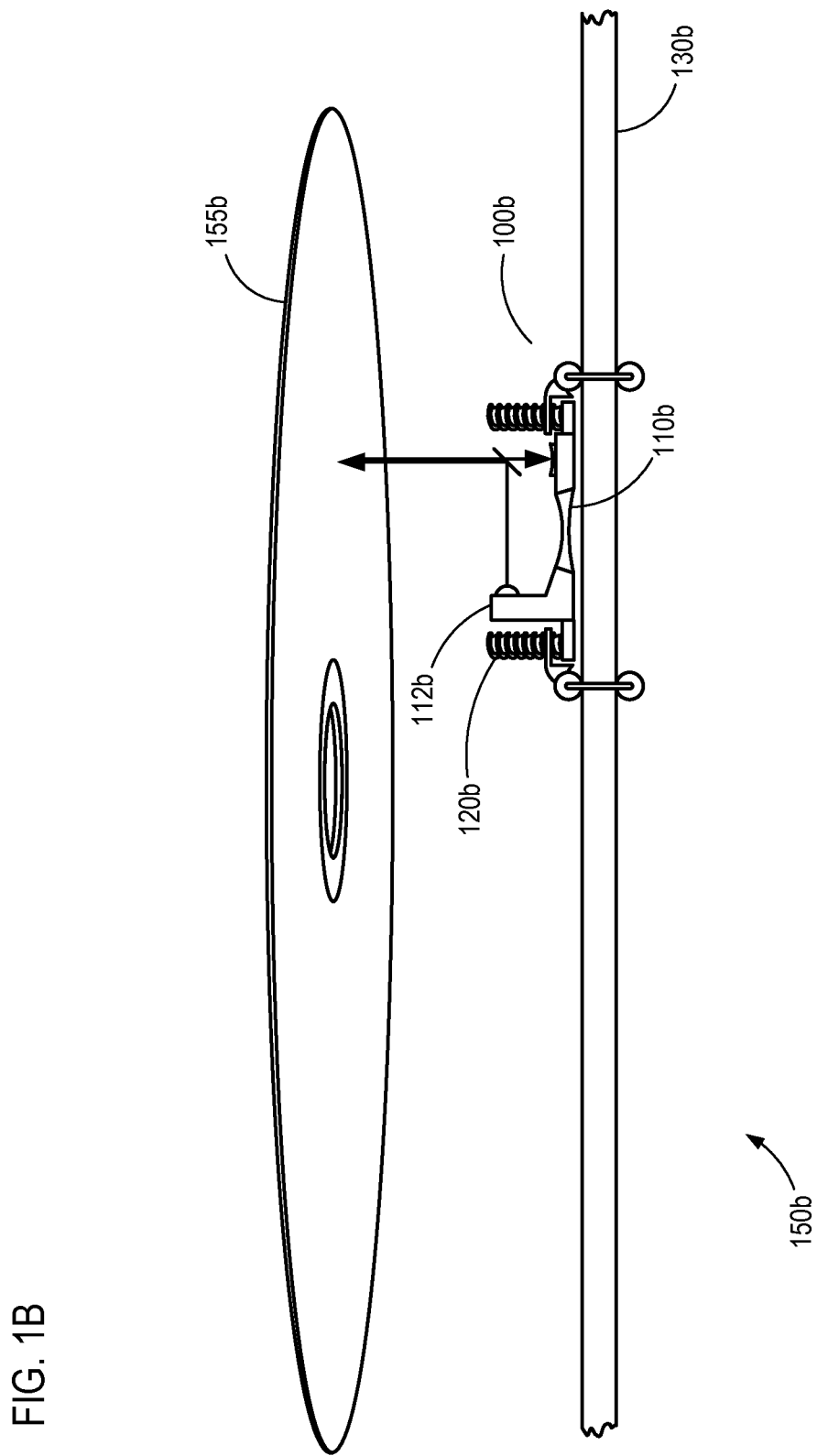
FIG. 1B is a perspective view of a control system for an optical storage device.

FIG. 1B is a perspective view of a control system 100b for an optical storage device 150b. The control system 100b may be configured to control an optical pickup head 110b including a laser 112b and optical sensor 114b that interact with an optical disk 155b. The optical pickup head 110b may be supported by a pair of rails 130b that suspend the optical pickup head 110b above the optical disk 155b. The optical pickup head 110b may move along the rails 130b to position the laser 112b and optical sensor 114b in a desired location relative to the optical disk 155b. In the illustrated embodiment, the optical pickup head 110b includes lead screws 120b actuated by servos (not shown) to adjust a height of the optical pickup head 110b relative to the rails 130b. In another embodiment, a height of the laser 112b and optical sensor 114b may be adjusted relative to the optical pickup head 110b.

Figure 2:
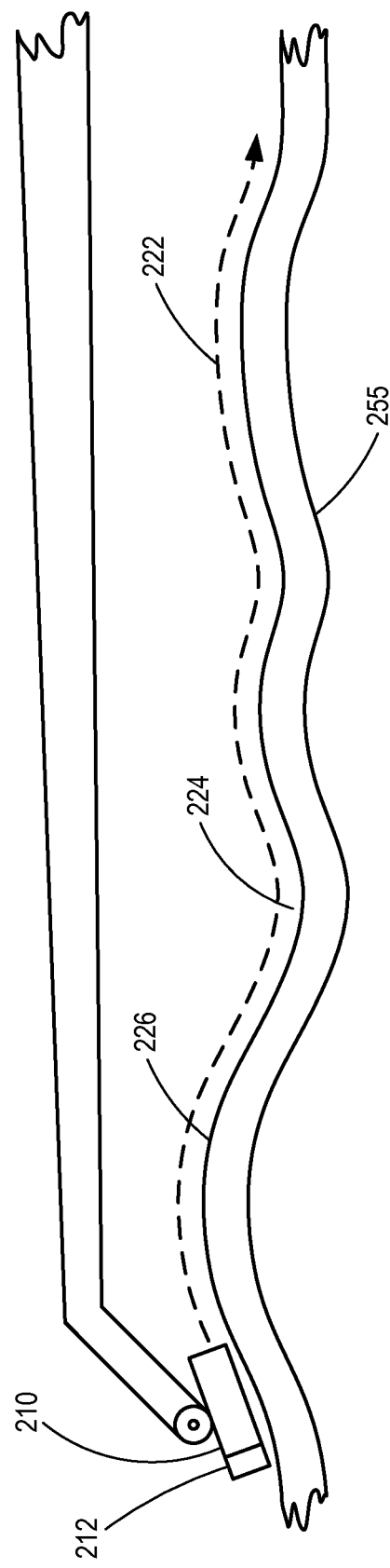
FIG. 2 is a perspective view of a slider above an uneven disk platter.

FIG. 2 is a perspective view of a slider 210 above an uneven disk platter 255. The disk platter 255 may include a sequence of dips 224 and protrusions 226 in its surface. A plurality of adjustments may be made to the height and/or orientation of the slider 210 to maintain a constant gap between a read/write head 212 and the disk platter 255. A path 222 that maintains the constant gap and/or a functional representation of the path 222 may be computed. Alternatively or in addition, a plurality of actuations to achieve the constant gap may be computed. A height control mechanism, such as height control mechanism 120a or lead screws 120b, may be configured to adjust the height of the slider 210 and/or the read/write head 212 based on the computed actuations.

Figure 3:
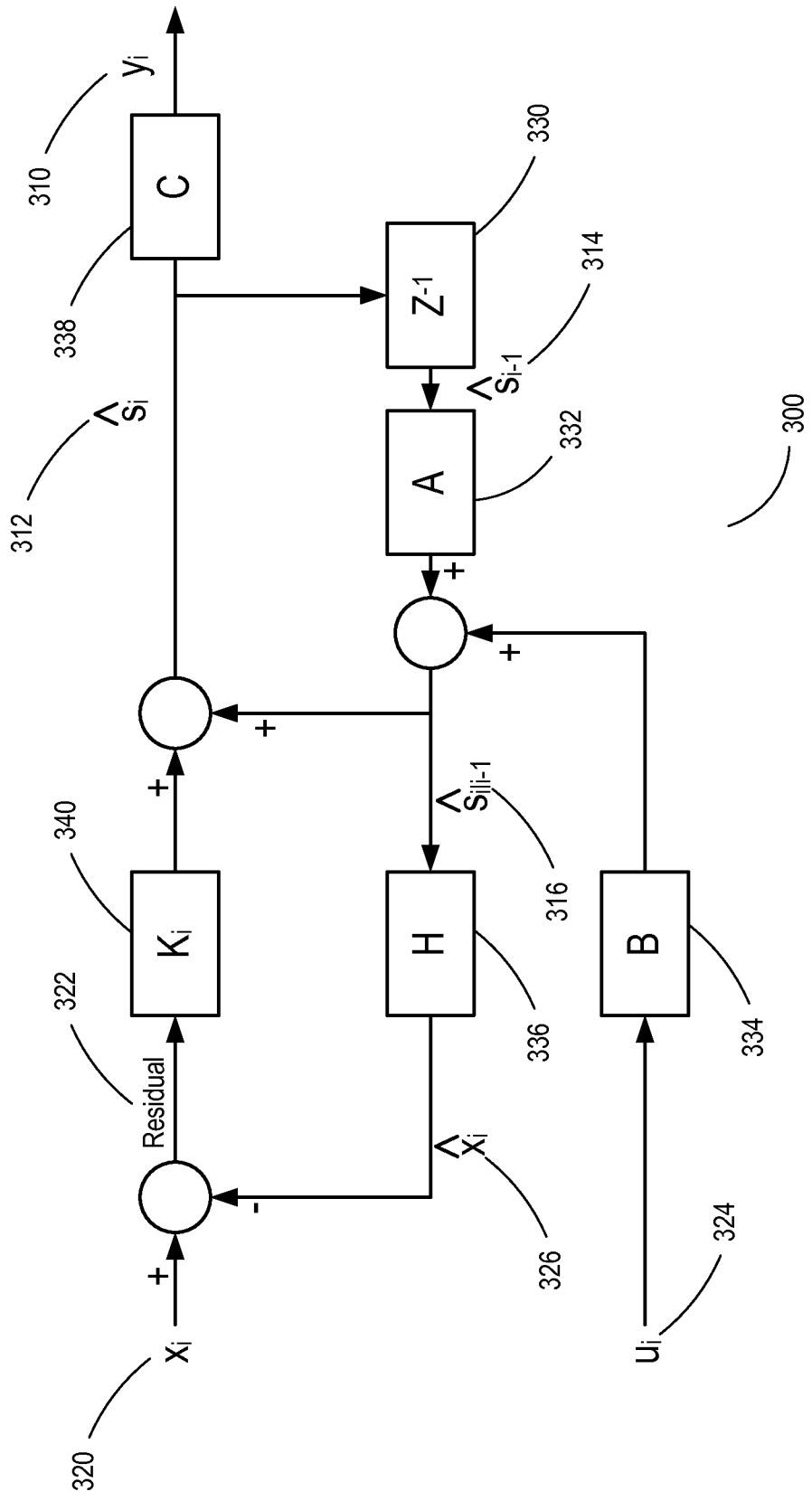
FIG. 3 is a block diagram of a Kalman filter that may be used by a computation unit to compute a topographic profile from measurement data including gap measurements.

FIG. 3 is a block diagram of a Kalman filter 300 that may be used by a computation unit (not shown) to compute a topographic profile 310 from measurement data 320 including gap measurements. The Kalman filter 300 may be configured to assume that the measurement data 320 includes random noise and that the height of the read/write head 212 is affected by random noise. The Kalman filter 300 may be further configured to filter the measurement data 320 to minimize the effects of the noise on the computed topographic profile 310. The Kalman filter 300 may store state information 312 from which the topographic profile 310 is determined. The state information 312 may be iteratively updated based on previous state information 314, control information 324, and the measurement data 320.

For example, the Kalman filter 300 may begin with state information 312, such as the height and/or velocity of the read/write head 212, the height and/or slope of topographic features, and/or the like. The state information 312 may be an estimate of a true state and may be represented by $\hat{s}_i$, where i is a discrete time point. The state information 312 may go through a delay 330 to produce previous state information 314, which may be represented by $\hat{s}_{i-1}$. Next, a priori state information 316 may be computed according to the equation $\hat{s}_{i|i-1} = A\hat{s}_{i-1} + Bu_i$ where $\hat{s}_{i|i-1}$ is the a priori state information 316, A is a state gain/transition model 332, $u_i$ is the control information 324, and B is a control gain/input model 334.

A measurement estimate 326 that estimates the measurement from the a priori state information 316 may be computed according to the equation $\hat{x}_i = H\hat{s}_{i|i-1}$, where $\hat{x}_i$ is the measurement estimate 326 and H is a measurement gain/observation model 336. A residual 322 may be computed by subtracting the measurement estimate 326 from the actual measurement data 320 measured by one or more sensors (not shown). The residual 322 may be multiplied by the Kalman gain 340 and added to the a priori state information 316 to produce updated state information 312 (i.e., $\hat{s}_{i|i-1} + K_i(x_i - \hat{x}_i)$ where $x_i$ is the measurement data 320 and $K_i$ is the Kalman gain 340). The topographic profile 310 may be computed from the state information 312 using an output gain/topographic model 338.

The topographic profile 310 may be represented by $h_i$, and the output gain/topographic model 338 may be represented by C. The state information 312 may include the topographic profile 310, and/or the topographic profile 310 may be derivable from the state information 312. In some embodiments, vertical motion of the slider 210 and/or an actuation required to maintain a desired gap may also or instead be determined from the state information 312.

In an embodiment, the Kalman filter may employ a simple three element state vector, one element being the height of the read/write head, the second being its vertical velocity, and the third being the height of the topographic profile. In this embodiment, the state transition gain A can be described by a 3-by-3 matrix in which the head height changes due to time progression of the head velocity, the head velocity changes due to time progression of the suspension and aerodynamic accelerations acting on the head; these may depend respectively on the head height and the difference between the head and topographic surface heights. In this embodiment, the measurement may be of the gap spacing, which can be related to the state vector by a 1-by-3 matrix H where the first element is 1, the second is 0, and the third is −1. In this embodiment, the Kalman gain, K, may be a 3-by-1 vector, computed from knowledge of A, H, and state and measurement covariance matrices by standard Kalman filter relations. In other embodiments, the dynamic filter can use additional state variables (e.g., representing azimuthal and radial slider motion, slider angular motion, relative motion between the read/write head and the slider, motion of counterbalances, flexure of the suspension system, parameters representing uncertain aspects of the models, etc.) and more sophisticated system models. In some embodiments, the topographic height can be represented by a suite of separate variables corresponding to separate locations on the surface, or to multiple parameters (e.g., Fourier coefficients) in a functional representation of the height's positional dependence. While the surface height generally may not actually vary in time, it may vary in location, which, because of their relative motion, can appear to the read/write head as a time variation.

The transition model 332, input model 334, topographic model 338, and/or observation model 336 may include models of read/write head dynamics, read/write head responses to control adjustments, interactions between the read/write head 212 and the disk platter 255, slider characteristics, suspension system characteristics, sensor characteristics, coupled behavior between the slider 210 and the disk platter 255, coupled behavior between a slider suspension and the disk platter 255, coupled behavior between slider aerodynamics and the disk platter 255, and/or the like. The models 332, 334, 336, 338 may be predetermined and/or factory loaded. The Kalman filter 300 may be configured to update the models 332, 334, 336, 338 based on its performance in estimating the state information 312.

In some embodiments, the dynamic filter may use a nonlinear Kalman filter; for instance in cases where the aerodynamic forces on the slider vary inversely with the gap spacing. The filter may use a discrete formulation, with state and measurements evaluated at discrete time values (or, correspondingly, at azimuthal angles related to time by the rotational speed of the disk platter); state and measurements may be updated at the same or at different intervals. The filter may use a continuous time (or angle) formulation. In embodiments, the filter may treat desired model parameters as state variables, such as where the filter is being used to update or refine its knowledge of the models 332, 334, 336, 338. It can incorporate a-priori estimates (e.g., from the manufacturer) of these parameters, as initial values, accompanied by appropriately sized covariance values, and/or by the process of pseudo-measurements where the filter is presented with one or more "measurements" of the parameter having the a-priori value. Similar techniques can be used to incorporate previously determined topographical values (e.g., determined during previous passes, or by manufacturer testing).

The dynamic filter can be used not just as a state estimator, but also as a dynamic controller, combining state estimation with optimized control to minimize a desired cost function. Examples of such control algorithms are described in State Functions and Linear Control Systems, by D G Schultz and J L Melsa, McGraw-Hill (1967) and in Optimum Systems Control, by A P Sage, Prentice-Hall (1968). In one embodiment, the cost function can be the squared deviation of the head-surface gap from a desired value, while the control variable can be an activation parameter of the slider's height control (e.g., applied by its suspension system). The cost function can include penalty functions, such as ones imposing large "costs" for gap spacings approaching zero. In some embodiments, the filter coefficients can be computed and updated in real time, such as during each pass of the head over the surface. In other embodiments, the filter coefficients can be pre-computed (e.g., during previous passes, supplied by the manufacturer, etc.).

Figure 4A:
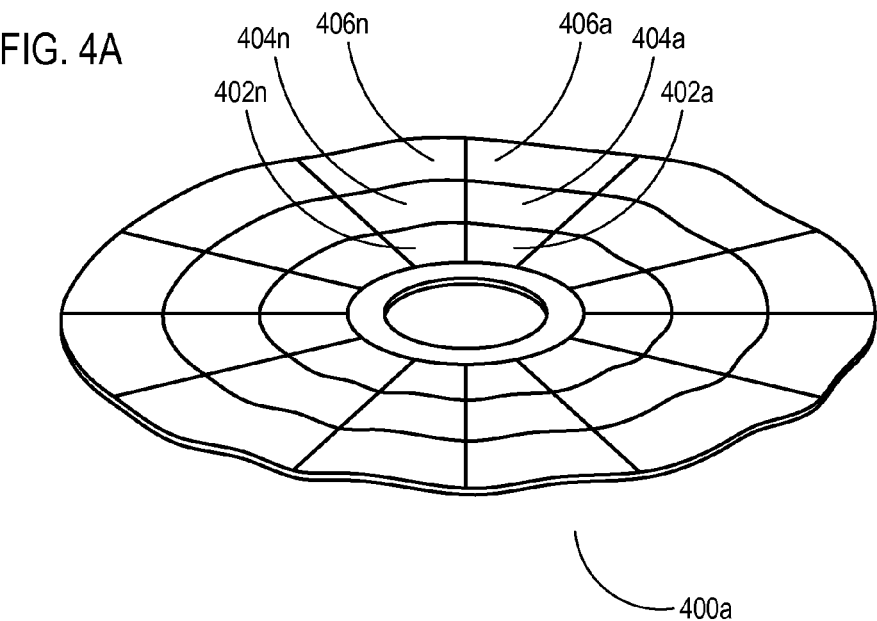
FIG. 4A is a perspective view of a disk platter with a plurality of radially and azimuthally divided sections.

FIG. 4A is a perspective view of a disk platter 400a with a plurality of radially and azimuthally divided sections 402a . . . n, 404a . . . n, 406a . . . n. The sections 402a . . . n, 404a . . . n, 406a . . . n may be disk sectors, disk tracks, and/or may be larger or smaller than disk sectors and/or disk tracks. The Kalman filter 300 may determine the topographic profile 310 as a function of position. Accordingly, a memory (not shown) may store topographic data on global height variations, such as an average, median, maximum, and/or minimum height, for each section 402a . . . n, 404a . . . n, 406a . . . n. Alternatively or in addition, the memory may store indications of local variations in each section 402a . . . n, 404a . . . n, 406a . . . n.

Figure 4B:
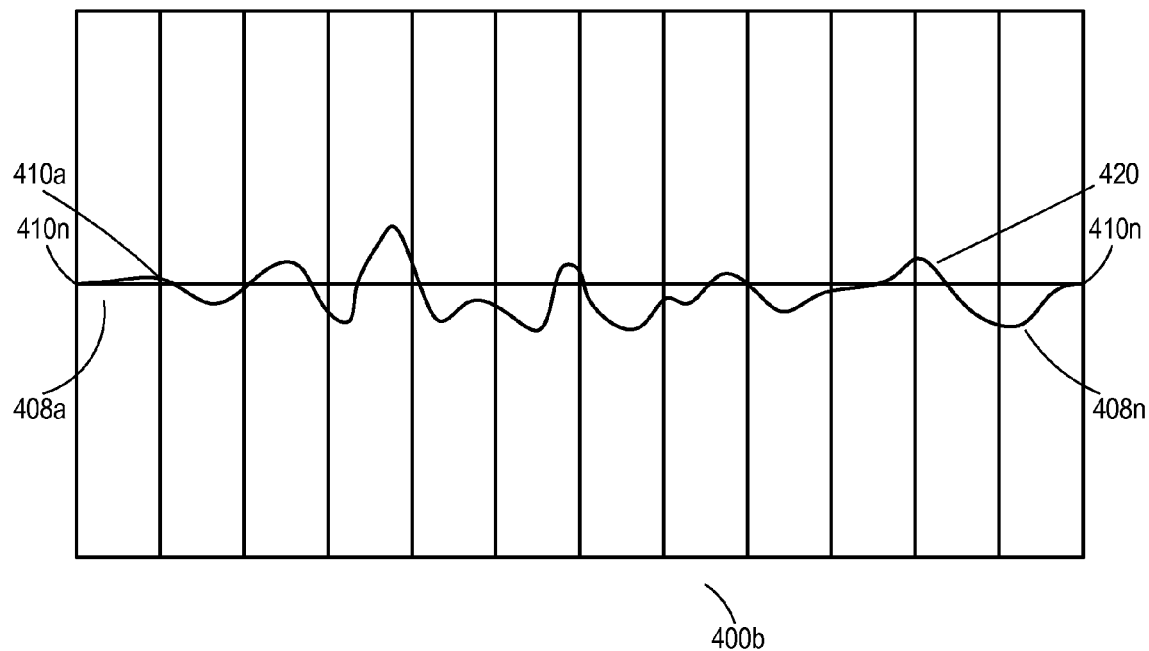
FIG. 4B is a graphical depiction of a functional representation of a topographic profile.

FIG. 4B is a graphical depiction 400b of a functional representation 420 of a topographic profile. The functional representation 420 may be a Fourier series, a spline fit, and/or the like. The functional representation 420 may be defined for a plurality of azimuthally and/or radially divided sections 408a . . . n. For a spline fit, the functional representation 420 may have a knot 410a . . . n between each section 408a . . . n. Alternatively, there may be more or fewer knots 410a . . . n than sections 408a . . . n. For a Fourier series, the memory (not shown) may store a plurality of Fourier coefficients. The number of Fourier coefficients stored may be the same as the number of sections 408a . . . n. The memory may store more or fewer coefficients than the number of sections 408a . . . n, such as a multiple of the number of sections 408a . . . n (e.g., twice or half as many Fourier coefficients as sections 408a . . . n).

Figure 5:
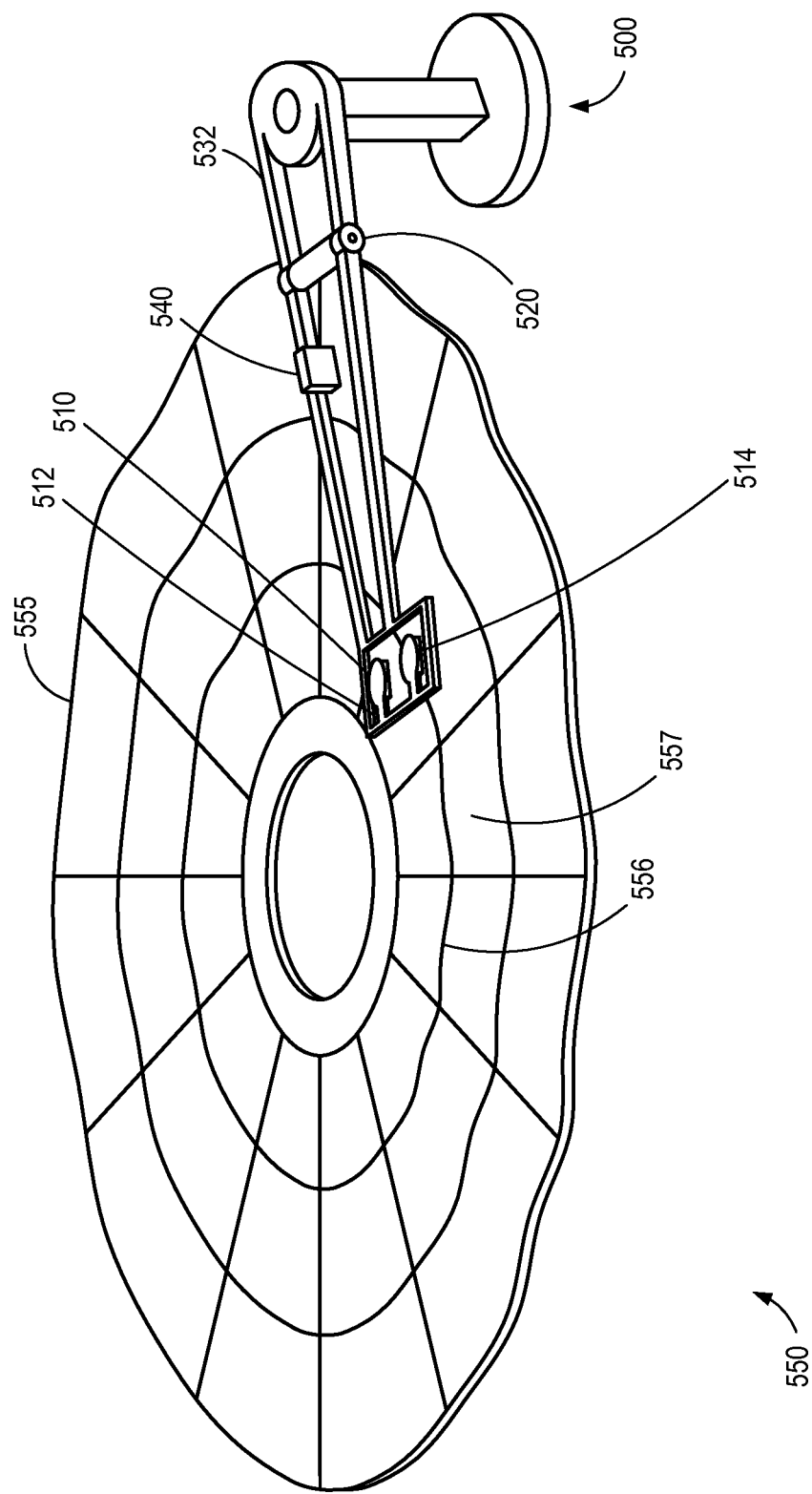
FIG. 5 is a perspective view of a control system for a magnetic storage device.

FIG. 5 is a perspective view of a control system 500 for a magnetic storage device 550. The control system 500 may be configured to control a slider 510 including a read/write head 512 that interacts with a current read/write track 556 on a magnetic disk platter 555. The slider 510 may also include a gap sensor 514 configured to measure a gap between the gap sensor 514 and/or the read/write head 512 and a side read/write track 557. The control system 500 may include a memory 540 attached to the arm 532. The memory 540 may store the gap measurements of the side track 557 and/or indications of topographic features computed from the gap measurements. The gap measurement and/or the indications of the topographic features may be encoded and/or processed before storage. Indications of the radial and/or azimuthal position of the topographic features may also be stored and/or the gap measurements and/or topographic features may be stored in a memory address corresponding to the radial and/or azimuthal position.

When the read/write head 512 is repositioned to interact with the side read/write track 557, the topographic features and/or gap measurements for the side read/write track 557 may be retrieved from the memory 540. A height control mechanism 520 may be configured to adjust the height of the slider 510 based on the retrieved topographic features and/or gap measurements. A computation unit (not shown) may use pattern-recognition and/or phase-processing algorithms to recognize recapitulation of topographic features. For example, the computation unit may be configured to recognize detected topographic features of the side read/write 557 from stored indications of topographic features of the current read/write track 556 and thereby to determine upcoming features on the current and/or side read/write track 556, 557. The topographic features may be associated in the memory 540 with a radial and/or azimuthal position. Accordingly, detected topographic features at a certain position may be compared with stored indications of topographic features having a same or similar position.

Figure 6A:
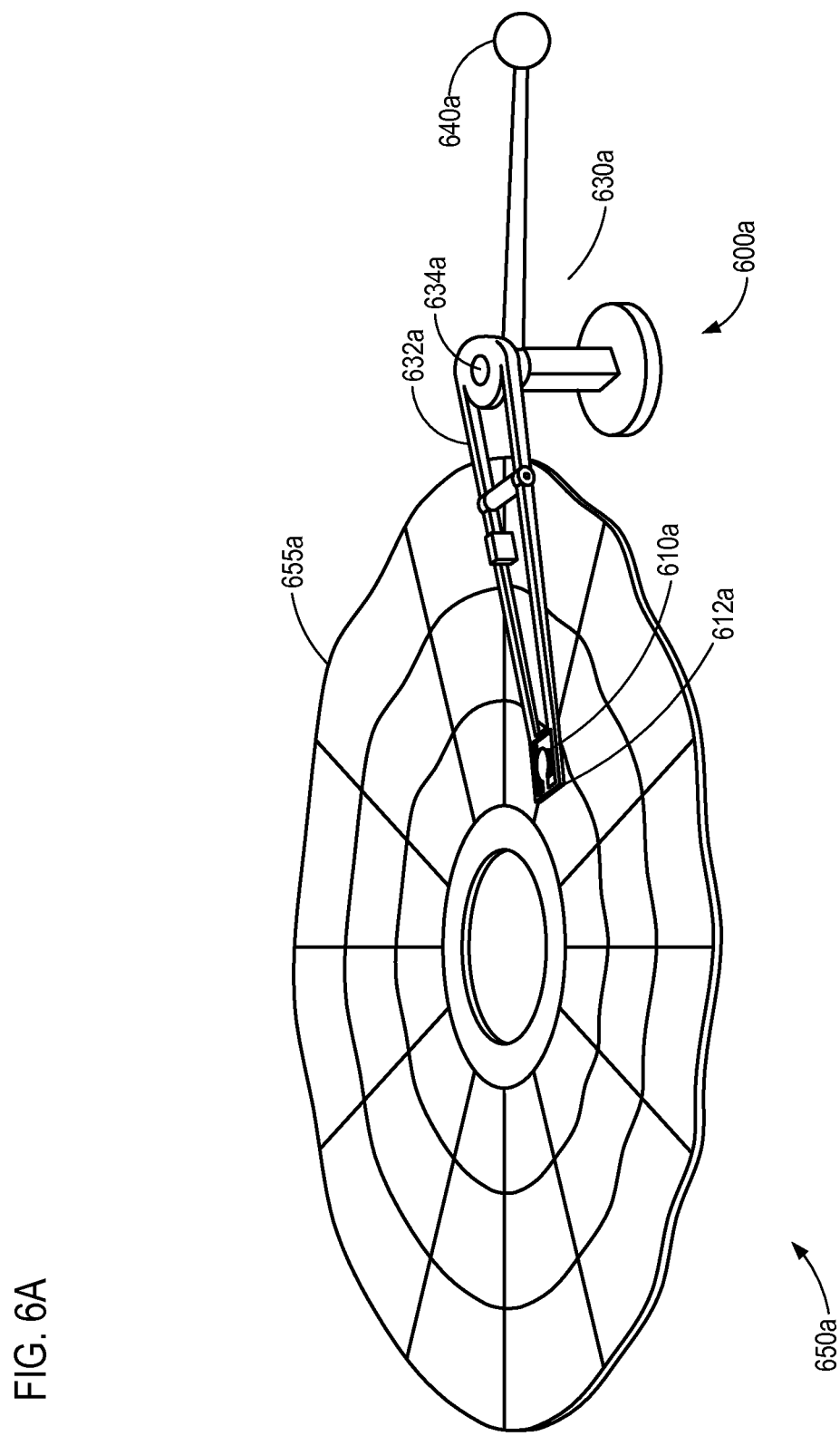
FIG. 6A is a perspective view of a reactionless control system for a magnetic storage device including a magnetic disk platter.

FIG. 6A is a perspective view of a reactionless control system 600a for a magnetic storage device 650a including a magnetic disk platter 655a. The reactionless control system 600a may include a suspension system 630a with an actuator 634a configured to rotate an arm 632a. The actuator 634a may be further configured to rotate a counterbalance 640a in a direction opposing the rotation of the arm 632a. For example, the actuator 634a may rotate the arm 632a clockwise and at the same time rotate the counterbalance 640a counterclockwise. The counterbalance 640a may weigh the same as the arm 632a, a slider 610a, and/or a read/write head 612a. Thus, the counterbalance 640a may isolate the suspension system 630a from torque and/or reaction forces resulting from movement of the read/write head 612a. Further, such isolation may prevent rotational movements from creating vertical motion in the read/write head 612a and/or slider 610a.

Figure 6B:
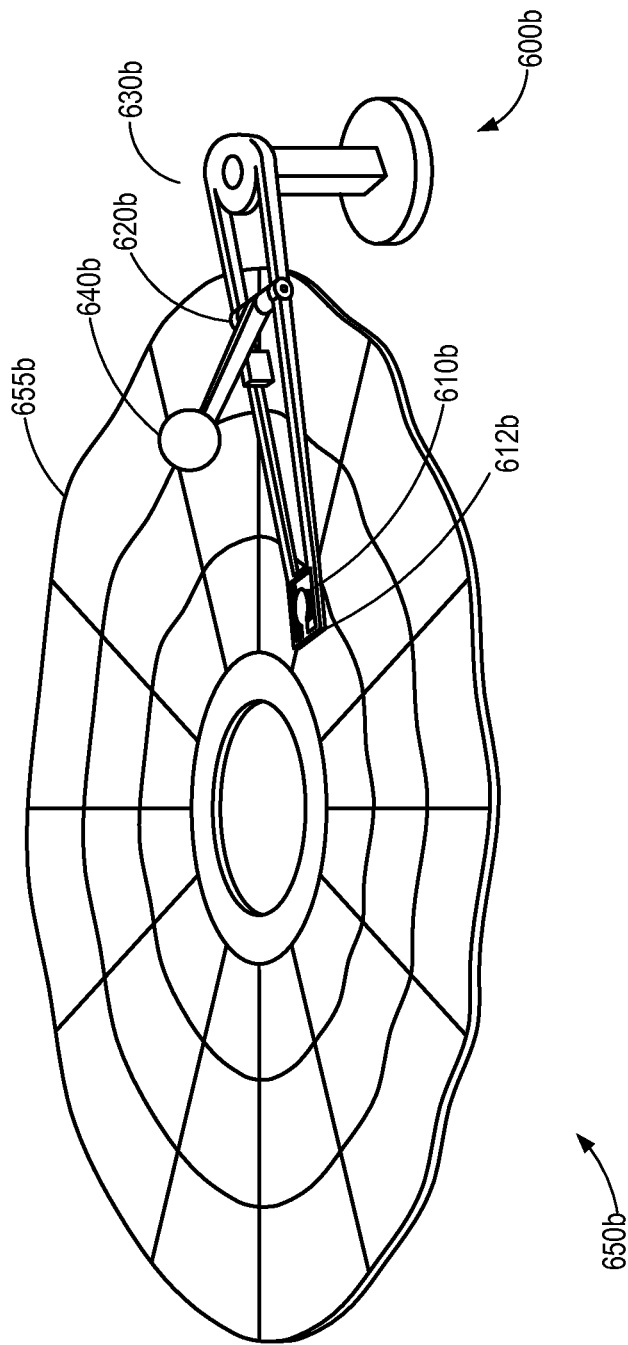
FIG. 6B is a perspective view of a reactionless control system for a magnetic storage device.

FIG. 6B is a perspective view of a reactionless control system 600b for a magnetic storage device 650b. The reactionless control system 600b may include a slider 610b coupled to a read/write head 612b configured to interact with a magnetic disk platter 655b. A height control mechanism 620b may be configured to adjust a height of the read/write head 612b and/or the slider 610b. The height control mechanism 620b may be further configured to adjust a height of a counterbalance 640b. The height control mechanism 620b may move the counterbalance 640b in a direction opposing motion of the slider 610b and/or read/write head 612b. For example, the height control mechanism 620b may move the counterbalance 640b up while moving the slider 610b and/or read/write head 612b down. The reactionless control system 600b may prevent motion of the slider 610b and/or read/write head 612b from applying a force and/or a torque on a suspension system 630b and/or creating undesired oscillations. In some embodiments, the counterbalance may be located on the slider and may be used to counteract motions of the read/write head relative to the slider.

It will be understood by those having skill in the art that many changes may be made to the details of the above-described embodiments without departing from the underlying principles of the disclosure. The scope of the present disclosure should, therefore, be determined only by the following claims.

The invention claimed is:

1. A system for controlling a read/write head configured to interact with read/write tracks on a rotating information storage surface, the system comprising:
a computation unit configured to compute a topographic profile of the rotating information storage surface, wherein the computation unit uses a dynamic filter to calculate the topographic profile from gap measurements, an estimate of a read/write head state at a previous point in time, and an estimate of a topographic profile at the previous point in time; and
a height control mechanism configured to adjust a height of the read/write head based on the topographic profile.

2. The system of claim 1, further comprising a slider coupled to the read/write head.

3. The system of claim 2, wherein the height control mechanism is configured to adjust the height to create a desired gap between the slider and the rotating information storage surface.

4. The system of claim 3, wherein the height control mechanism is configured to maintain a constant gap.

5. The system of claim 1, wherein the height control mechanism is configured to adjust the height to create a desired gap between the read/write head and the rotating information storage surface.

6. The system of claim 5, wherein the height control mechanism is configured to maintain a constant gap.

7. The system of claim 5, wherein the computation unit is further configured to compute a control adjustment to achieve the desired gap.

8. The system of claim 7, wherein the computation unit is configured to compute the control adjustment using the dynamic filter, and wherein the dynamic filter comprises a model of read/write head responses to control adjustments.

9. The system of claim 8, wherein the dynamic filter comprises a model of a frequency response of the read/write head to the control adjustments.

10. A non-transitory computer-readable storage medium comprising program code for performing a method for controlling a read/write head configured to interact with a plurality of read/write tracks on a rotating information storage surface, the method comprising:
computing a topographic profile of the rotating information storage surface, wherein computing uses a dynamic filter to calculate the topographic profile from gap measurements, an estimate of a read/write head state at a previous point in time, and an estimate of a topographic profile at the previous point in time; and
adjusting a height of the read/write head based on the topographic profile.

11. The non-transitory computer-readable storage medium of claim 10, wherein computing a topographic profile comprises computing the topographic profile using a noise reduction filter.

12. The non-transitory computer-readable storage medium of claim 10, wherein computing a topographic profile comprises computing the topographic profile using a dynamic filter comprising a model of interactions between the read/write head and the rotating information storage surface.

13. The non-transitory computer-readable storage medium of claim 12, wherein computing a topographic profile comprises computing the topographic profile using a model including at least one interaction selected from the group consisting of aerodynamics, electrostatics, magnetic, Casimir, evanescent, and Van der Waals.

14. The non-transitory computer-readable storage medium of claim 10, wherein the method further comprises moving the read/write head with a slider coupled to the read/write head.

15. The non-transitory computer-readable storage medium of claim 13, wherein computing a topographic profile comprises computing the topographic profile using a dynamic filter comprising a model of characteristics of the slider.

16. The non-transitory computer-readable storage medium of claim 14, wherein at least one slider characteristic is selected from the group consisting of a mass, an inertial moment, a geometry, and an aerodynamic characteristic.

17. The non-transitory computer-readable storage medium of claim 13, wherein computing a topographic profile comprises computing the topographic profile using a dynamic filter comprising a model of characteristics of a suspension system supporting the slider.

18. The non-transitory computer-readable storage medium of claim 16, wherein at least one suspension system characteristic is selected from the group consisting of a force, a stiffness, a moment, and an inertia.

19. The non-transitory computer-readable storage medium of claim 13, wherein computing a topographic profile comprises computing the topographic profile using a dynamic filter comprising a model of coupled behavior between a slider suspension and the rotating information storage surface.

20. The non-transitory computer-readable storage medium of claim 13, wherein computing a topographic profile comprises computing the topographic profile using a dynamic filter comprising a model of coupled behavior between slider aerodynamics and the rotating information storage surface.

21. The non-transitory computer-readable storage medium of claim 13, wherein the method further comprises determining vertical motion of the slider using the dynamic filter.

22. The non-transitory computer-readable storage medium of claim 20, wherein determining vertical motion comprises determining a height of the slider.

23. The non-transitory computer-readable storage medium of claim 20, wherein determining vertical motion comprises determining a velocity of the slider.

24. The non-transitory computer-readable storage medium of claim 20, wherein determining vertical motion comprises determining oscillations of the slider.

25. The non-transitory computer-readable storage medium of claim 10, wherein the method further comprises storing the topographic profile in a memory.

26. The non-transitory computer-readable storage medium of claim 24, wherein computing a topographic profile comprises computing the topographic profile based on a stored topographical profile stored in the memory.

27. The non-transitory computer-readable storage medium of claim 25, wherein computing a topographic profile comprises computing the topographic profile using a dynamic filter receiving the stored topographic profile as input.

28. The non-transitory computer-readable storage medium of claim 25, wherein the method further comprises an initial step of computing the stored topographic profile.

29. The non-transitory computer-readable storage medium of claim 24, wherein storing the topographic profile comprises storing a processed form of the topographic profile in the memory.

30. The non-transitory computer-readable storage medium of claim 24, wherein storing the topographic profile comprises storing an encoded form of the topographic profile in the memory.

31. The non-transitory computer-readable storage medium of claim 10, wherein computing a topographic profile comprises computing the topographic profile during operational interaction between the read/write head and the rotating information storage surface.

32. The non-transitory computer-readable storage medium of claim 30, wherein computing a topographic profile comprises determining changes to the topographic profile during operation.

33. The non-transitory computer-readable storage medium of claim 30, wherein the method further comprises determining changes to system characteristics during operational interaction between the read/write head and the rotating information storage surface.

* * * * *